United States Patent [19]

Mathes et al.

[11] Patent Number: 4,855,150
[45] Date of Patent: Aug. 8, 1989

[54] ICE CREAM CONE WITH IMPRINTED BAND

[76] Inventors: Larry W. Mathes, 341 Lincoln Hills Rd.; William R. Snyder, P.O. Box 338, both of Corydon, Ind. 47112

[21] Appl. No.: 185,704

[22] Filed: Apr. 25, 1988

[51] Int. Cl.[4] .............................................. A21D 13/00
[52] U.S. Cl. ........................................ 426/87; 426/139; 426/132; 426/138; 40/637
[58] Field of Search ................ 426/95, 100, 101, 132, 426/138, 139, 87, 383; D1/101, 116–119; D20/19, 22, 27; 40/637, 306, 310, 317, 324, 665

[56] References Cited

U.S. PATENT DOCUMENTS

| | | | |
|---|---|---|---|
| 54,665 | 5/1866 | Alterbury | 40/310 |
| 260,055 | 6/1882 | Schwarzschild | 426/87 |
| 365,146 | 6/1887 | Moodie | 40/310 |
| 1,013,244 | 1/1912 | Watson | 426/132 |
| 1,054,826 | 3/1913 | Cole | 40/306 |
| 1,360,229 | 11/1920 | Kolstad | 40/310 |
| 1,502,006 | 7/1924 | Alvord | 426/87 |
| 1,690,556 | 11/1928 | Shapiro | 426/139 |
| 1,849,774 | 3/1932 | Taylor | 426/87 |
| 1,856,550 | 5/1932 | Guenard | 40/310 |
| 1,974,401 | 9/1934 | Miller | 40/306 |
| 2,093,985 | 9/1937 | Stansburg | 40/306 |
| 2,125,069 | 7/1938 | Fenner | 426/132 |
| 2,139,031 | 12/1938 | Neher | 40/310 |
| 2,234,475 | 3/1941 | Hyndman | 40/310 |
| 2,435,906 | 2/1948 | Shapiro | 426/139 |
| 2,452,174 | 10/1948 | Arnold . | |
| 2,462,497 | 2/1949 | Heyman . | |
| 2,557,602 | 6/1951 | Huitt et al. | 426/139 |
| 2,844,893 | 7/1958 | Keller | 40/306 |
| 2,877,117 | 3/1959 | Heyman . | |
| 3,366,486 | 1/1968 | Weinstein et al. | 426/138 |
| 4,136,800 | 1/1979 | Christner et al. . | |
| 4,226,355 | 10/1980 | Helfrich, Jr. . | |
| 4,289,791 | 9/1981 | Weinstein . | |
| 4,312,523 | 1/1982 | Haines | 40/306 |
| 4,313,965 | 2/1982 | Weinstein . | |
| 4,600,102 | 7/1986 | Avila | 40/306 |
| 4,720,037 | 1/1988 | Alpert | 426/101 |

FOREIGN PATENT DOCUMENTS 206335  5/1955  Australia .............................. 40/310

OTHER PUBLICATIONS

Institutions 7/67 p. 205.
Food Engineering 9/56 p. 148.

Primary Examiner—Steven Weinstein
Attorney, Agent, or Firm—Barnes & Thornburg

[57] ABSTRACT

According to the present invention, a pastry cone includes a lower portion and an upper portion. The lower portion of the cone provides a sloping gripping surface having vertically extending ribs to permit the cone to be gripped by a user. The upper portion of the cone includes a straight cylindrical section bounded by an upper circumferentially extending rib and a lower circumferentially extending rib. A rectangular-shaped removable band extends around the cone between the upper and lower ribs. The band includes a visual display containing an advertisement or other information.

4 Claims, 1 Drawing Sheet

ICE CREAM CONE WITH IMPRINTED BAND

SUMMARY OF THE INVENTION

The present invention relates to an ice cream cone having an imprinted band around the cone. More particularly, the present invention relates to an ice cream cone having an easily removable imprinted band around an upper portion of the cone.

Conventional ice cream cones designed to hold one or more scoops of ice cream or other frozen confectionary deserts generally have an upper portion with an upper opening for receiving and containing the ice cream. Below this upper portion is a generally frustro-conical shaped portion which terminates in a lower flat surface which serves as a base for the cone. The lower frustro-conical shaped portion may include a series of ribs or other raised areas to provide a gripping surface for the cone. This gripping surface for the cone is intended to be utilized by the user to grasp and hold the cone while the ice cream is being consumed. The lower portion is generally separated from the upper portion by a somewhat flared intermediate transition area which may include an outwardly extending rib.

It is known to provide a paper or other type of covering for the lower portion of such conventional cones. Such a covering is provided for sanitation purposes to prevent contamination of the cone due to handling by various persons before reaching the ultimate consumer. It is known to imprint the protective cover with advertising or other types of information. It is further known to attach the protective covering such that the covering can be removed when the customer desires to consume the lower portion of the cone. One problem with this type of protective covering on the lower portion of a conventional cone is that, because the covering is on the portion of the cone being held by the consumer, any advertising or other information contained on the covering is normally hidden from view while the cone is being held. Another problem with this type of conventional covering is that, in order to remove the covering, the cone must be temporarily held by another section of the cone which is not configured to provide a gripping surface for the consumer.

It is therefore one object of the present invention to provide a cone and band combination in which the band is prominently displayed on the cone while the food substance in the cone is being consumed.

Another object of the present invention is to provide a cone and band combination in which the band fits around a portion of the cone separate from the portion of the cone which provides the gripping surface.

Yet another object of the present invention is to provide a cone and band combination in which the band is easily removable from the cone while the cone is being held about the gripping surface of the cone.

According to the present invention, the combination of a pastry cone and band is provided. The cone includes a lower portion and an upper portion, with the lower portion providing a gripping surface to permit the cone to be gripped by a user. The upper portion includes a straight cylindrical section that is bounded by an upper, circumferentially extending rib and a lower circumferentially extending rib. A rectangular-shaped band is provided that extends around the cone in the straight cylindrical section between the upper and lower rib.

One feature of the foregoing structure is that a straight cylindrical section having bordering upper and lower ribs is provided in an upper portion of the cone. One advantage of this feature is that, by providing a straight cylindrical section having bordering ribs, an imprinted band can be placed around the straight cylindrical section and restrained from undesired movement out of that designated section.

Another feature of the foregoing structure is that the upper portion, including the straight cylindrical section, is separated from the lower portion which provides the gripping surface for the cone. One advantage of this feature is that the imprinted band containing any desired advertisement or other information is prominently in view while the cone is being held by the user.

In preferred embodiments of the present invention, the band that is placed around the straight cylindrical section is easily removable from the cone. One advantage of this feature is that, should the user desire to consume the entire cone, the imprinted band can be easily removed while the user is holding the cone by the designated gripping surface.

Also in preferred embodiments of the present invention, the band comprises a first portion and an attached second portion, with the first portion extending around the straight cylindrical section of the cone and the second portion extending freely away from the cone. One advantage of this feature is that the second portion of the band can be utilized as a tab which permits easy grasping and removal of the band when desired.

Thus, the present combination provides an ice cream cone with an imprinted band such that the imprinted band is in a prominent location and visible while the cone is being held by the consumer. The band is easily removable from the cone, again while the cone is being held, such that the entire cone can be consumed when desired. The band can be imprinted with any desired type of advertisement or other information, either words or designs.

Additional objects, features, and advantages of the invention will become apparent to those skilled in the art upon consideration of the following detailed description of a preferred embodiment exemplifying the best mode of carrying out the invention as present perceived.

BRIEF DESCRIPTION OF THE DRAWINGS

The detailed description particularly refers to the accompanying figures in which.

DETAILED DESCRIPTION OF THE DRAWINGS

Figure 1:
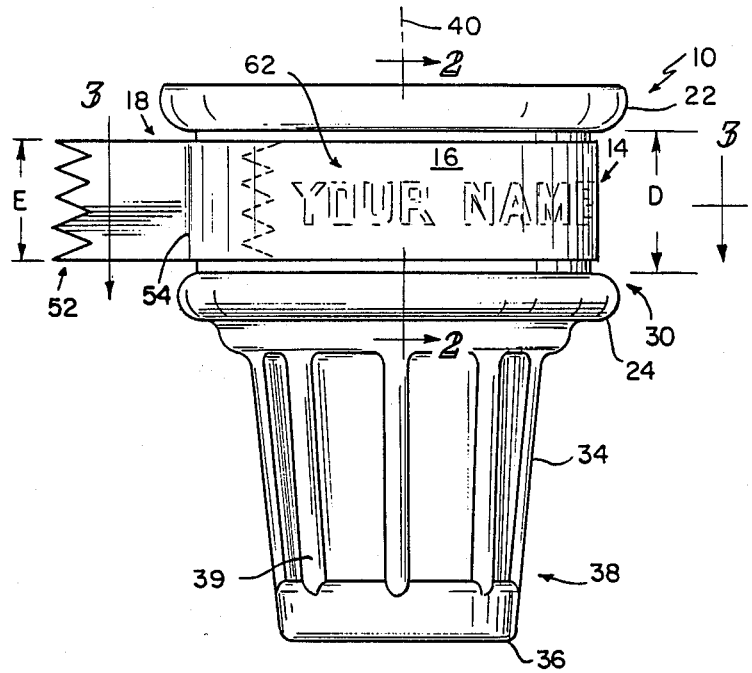
FIG. 1 is an elevational view of the cone and band combination of the present invention.

Referring now to the drawings, FIG. 1 shows an ice cream cone 10 and band 14 combination according to the present invention. The cone 10 is of the baked pastry type and may be formed in molds in a conventional manner. The band 14 includes a first portion 16 which extends around the cone 10, and a free second portion 18 which forms a pull tab, the use of which will be discussed later. The band 14 is primarily designed to include some type of printed material, either in the form of letters or figures or a combination of both. The printed material may be on the outside of the band 14 so that the printed material is visible when the band 14 is on the cone 10, or may be printed on the inside of the band 14, or a combination of both. The printed material may include advertising slogans, brand descriptions, questions on the outside of the band 14 and answers on the inside, or any other type of printed or graphic expression.

The cone 10 includes a circumferentially extending upper rim 22 at its upper end and a spaced-apart, circumferentially extending lower rim 24 disposed below the upper rim 22. A straight cylindrical section 28 is formed between the upper rim 22 and a lower rim 24 for receiving the band 14. The width of the straight cylindrical section 28 (illustrated by the dimension D) is slightly greater than the width of the band 14 (illustrated by the dimension E) so that the band 14 engages the straight cylindrical section 28 between the upper rim 22 and lower rim 24. The part of the cone 10 between and including the upper rim 22 and the lower rim 24 defines an upper portion 30 of the cone 10.

A frustro-conical section 34 of the cone 10 is disposed directly below the upper portion 30. The frustro-conical section 34 tapers inwardly from the lower rim 24 toward a flat planar base 36. The flat base 36 provides a flat surface upon which the cone 10 can rest. The frustro-conical section 34 and flat surface 36 cooperate to define a lower portion 38 of the cone 10 The frustro-conical section 34 provides a gripping surface for the cone 10 by which the cone 10 is designed to be held by a user. The frustro-conical section 34 may include ribs 39 to strengthen the frustro-conical section 34 as well as to provide surfaces with which the section 34 may be gripped by the user. A vertical axis 40 is defined by a line extending through the center of the upper portion 30 and lower portion 38 of the cone 10.

Figure 2:
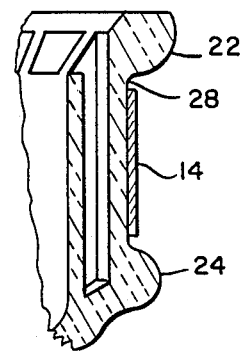
FIG. 2 is a sectional view taken along lines 2—2 of FIG. 1.

FIG. 2 shows in greater detail the orientation of the upper rim 22, the lower rim 24, and the intermediate straight cylindrical section 28. FIG. 2 also shows in greater detail the placement of the band 14 on the straight cylindrical section 28. The straight cylindrical section 28 defines a vertical face that is parallel to the vertical axis 40 (FIG. 1). It will be understood that, by providing a straight cylindrical section 28, a rectangular-shaped band 14 can be utilized to achieve a Perfect fit around the straight cylindrical 28. If the cylindrical section 28 was for example frustro-conical shaped, the band 14 would have to have different edge lengths in order to fit flush within that area.

The upper rim 22 and lower rim 24 act as upper and lower boundaries to maintain the position of the band 14 on the straight cylindrical section 28. Thus, with the band 14 properly positioned on the straight cylindrical section 28, the band 14 is prevented from slipping either upwardly or downwardly out of the straight cylindrical section 28. This is advantageous in that, once the band 14 has been placed on the straight cylindrical section 28 as will be described below, the cone 10 can be handled without the potential for undesired displacement of the band 14 away from the straight cylindrical section 28.

Figure 3:
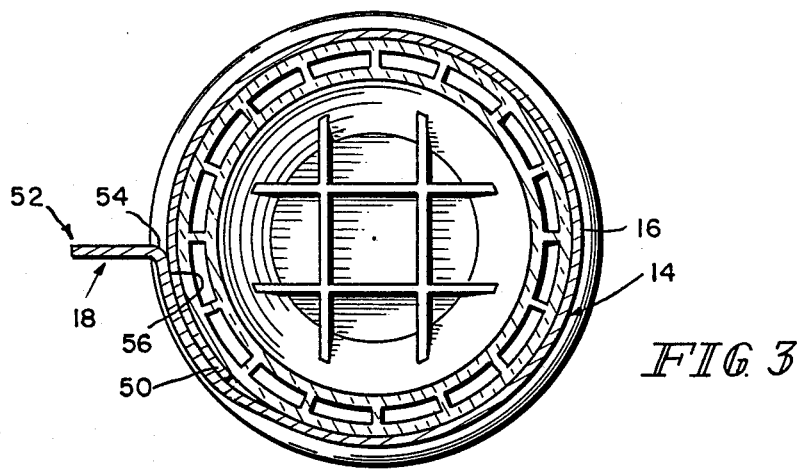
FIG. 3 is a sectional view taken along lines 3—3 of FIG. 1.

FIG. 3 shows in greater detail the attachment of the band 14 to the straight cylindrical section 28 and the orientation of the first portion 16 and the second portion 18 of the band 14. Specifically, the band 14 includes a first end 50 which is associated with the first portion 16. A second end 52 opposite the first end 50 is associated with the second portion 18. The band 14 is placed around the straight cylindrical section 28 of the cone 10 such that the second section 18 extends away from the cone 10 to provide a tab. The tab is provided to enable a user to easily remove the band 14 from the cone 10 when desired. The demarcation between the first portion 16 which engages the straight cylindrical section 28 and the second portion 18 which defines a tab is identified by a fold line 54. It will be understood that there are many ways to attach the band 14 to the cone 10, and it is anticipated that this attachment will be conducted in an assembly line-like manner.

Specifically, in the preferred embodiment, a glue strip 56 is placed on the inner surface of the band 14 between the first end 50 and the fold line 54. As can be seen, the glue strip 56 will be substantially adjacent the fold line 54 and may be, for example, one-eighth inch (3.175 mm) in width. The glue used in the glue strip 56 is preferably a non-toxic, edible type of glue, the choice of which will be known to those skilled in the art. Specifically, the choice of the glue for the glue strip 56 will be dictated by the choice of material for the band 14, which, in the preferred embodiment, is paper.

As discussed above, it is anticipated that the band 14 will be placed around the cone 10 in an assembly line manner utilizing automatic equipment. The first end 50 should be placed in contact with the straight cylindrical section 28, with the remaining first portion 16 then placed around the straight cylindrical section 28. It will be understood that the distance between the first end 50 of the band 14 and the glue strip 56 will be slightly greater than the outer circumference of the straight cylindrical section 28. This dimensional relationship will Permit the glue strip 56 to contact and be adhered to the outer side of the first end 50. After the glue strip 56 has come in contact with the first end 50, the second portion 18 is folded outwardly away from the cone 10 to form the fold line 54. Again, the technique for attaching the band 14 to the straight cylindrical section 28 can be done in several different ways, and is only described above as an illustration of one preferred method. To remove the band 14, the user simply grasps the outwardly extending section 18 of the band 14 and pulls outwardly to separate the glue strip 56 from the first end 50. Once the glue strip 56 is freed from the first end 50, the band 14 is free from the cone 10.

Figure 4:
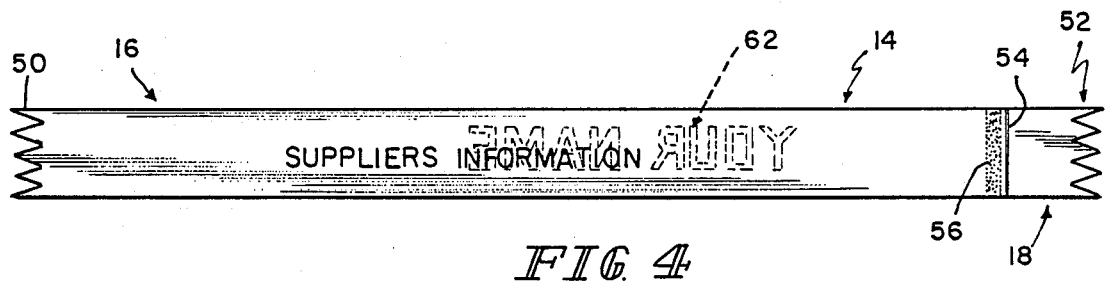
FIG. 4 is an elevational view of the band in layout position.

FIG. 4 shows in greater detail the band 14. Specifically, FIG. 4 shows the relationship between the first end 50, the second end 52, the glue strip 56, and the fold line 54. FIG. 4 also shows an example of Printed matter 62 which may be placed on the band 14. As discussed above, any type of printed matter can be printed on either the outer surface of the band 14 or the inner surface of the band 14, or on both surfaces as desired. It is anticipated that the inner surface of the band 14 could be utilized to print answers to questions, or certain other prize identifying material which would only be known to the user once the band 14 was removed.

Thus, the cone 10 and band 14 combination provides an ice cream cone 10 with a band 14 having printed matter which is prominently visible while the cone 10 is being held. The band 14 is easily removable so that the entire cone 10 may be consumed if desired. The combination possible for information that can be included on the band 14 are substantially unlimited, which greatly increases the utility of the present invention.

Although the invention has been described in detail with reference to a preferred embodiment, variations and modifications exist within the scope of the present invention a defined in the following claims.

What is claimed is:

1. In combination, a pastry cone having a lower portion and an upper portion, the lower portion providing a sloping gripping surface with vertically extending ribs to permit the cone to be gripped by a user, the upper portion including a straight cylindrical section bounded by an upper circumferentially extending rib and a lower circumferentially extending rib, and a rectangular-shaped removable band that has a width slightly smaller than the width of the straight cylindrical section between said upper and lower ribs and that extends around but is not adhered to the cone between the upper and lower rib in the straight cylindrical section and with a visual display on the band, wherein the band comprises a first portion and an attached second portion, the first portion extending around the straight cylindrical section of the cone and having an attachment surface adjacent the second portion which overlies and is secured to an end of the first portion, most remote from the attached second portion, to secure the first portion to itself and about the cone between the upper and lower ribs with said ribs configured to retain the secured band from slipping upwardly or downwardly out of the straight cylindrical section, the second portion extending freely away from the cone providing a tab for removing the band from the cone by grasping the cone sloping gripping surface with one hand and by pulling the attachment surface away from the end of the first portion with another hand to release the band from the cone by disengagement of the attachment surface and permit the entire cone to be consumed when desired.

2. The combination of claim 1, wherein the band is formed from a thin, pliable material.

3. The combination of claim 2, wherein the band is formed from paper.

4. The combination of claim 1, wherein the band secured to the cone has two visual displays, one facing outwards of the cone and the other facing towards the cone.

* * * * *